United States Patent
Wöste et al.

(10) Patent No.: US 7,276,103 B2
(45) Date of Patent: Oct. 2, 2007

(54) METHOD AND DEVICE FOR SEPARATING MOLECULES HAVING DIFFERENT EXCITATION SPECTRA

(75) Inventors: Ludger Wöste, Berlin (DE); Albrecht Lindinger, Berlin (DE); Cosmin Lupulescu, Berlin (DE)

(73) Assignee: Freie Universitat Berlin, Berlin (DE)

( * ) Notice: Subject to any disclaimer, the term of this patent is extended or adjusted under 35 U.S.C. 154(b) by 56 days.

(21) Appl. No.: 10/909,135

(22) Filed: Jul. 30, 2004

(65) Prior Publication Data

US 2005/0023127 A1 Feb. 3, 2005

(30) Foreign Application Priority Data

Aug. 1, 2003 (DE) ............... 103 36 057

(51) Int. Cl.
  *B03C 3/68* (2006.01)
(52) U.S. Cl. ............ 95/3; 96/2; 96/19; 96/25; 204/157.22
(58) Field of Classification Search ....... 204/157.2, 204/157.22, 157.3; 95/3, 58; 96/2, 19, 25, 96/26, 52; 250/284, 290
 See application file for complete search history.

(56) References Cited

U.S. PATENT DOCUMENTS

| | | | | |
|---|---|---|---|---|
| 3,443,087 A | | 5/1969 | Robieux et al. ........... 250/290 |
| 3,772,519 A | | 11/1973 | Levy et al. ............... 250/284 |
| 3,937,956 A | * | 2/1976 | Lyon ..................... 204/157.22 |
| 4,176,025 A | * | 11/1979 | Chen et al. ............. 204/157.21 |
| 4,254,336 A | * | 3/1981 | Rostler .................. 250/294 |
| 4,336,230 A | * | 6/1982 | Bethe et al. ........... 204/157.22 |
| 4,399,010 A | * | 8/1983 | Lyon et al. ............ 204/157.22 |
| 4,584,072 A | * | 4/1986 | Arisawa et al. ........ 204/157.22 |
| 4,655,890 A | * | 4/1987 | Robinson et al. ....... 204/157.22 |
| 4,690,742 A | * | 9/1987 | Cantrell et al. ......... 204/157.2 |
| 4,824,537 A | * | 4/1989 | Arai et al. ............. 204/157.22 |
| 4,946,567 A | * | 8/1990 | Michon et al. ........ 204/157.22 |
| 5,011,584 A | * | 4/1991 | Godfried ............... 204/157.22 |
| 5,149,406 A | * | 9/1992 | Mullen et al. ......... 204/157.22 |
| 5,316,635 A | * | 5/1994 | Green et al. .......... 204/157.22 |

(Continued)

FOREIGN PATENT DOCUMENTS

EP 325273 A1 * 7/1989 ............ 204/157.22

OTHER PUBLICATIONS

Lindinger et al., "Isotope Selective Ionization by Optimal Control Using Shaped Femtosecond Laser Pulses," Physical Review Letters, Jul. 16, 2004, p. 033001-1, vol. 98, No. 3, The American Physical Society, U.S.

*Primary Examiner*—Richard L. Chiesa
(74) *Attorney, Agent, or Firm*—Thorpe North & Western LLP

(57) ABSTRACT

The invention relates to a method for the separation of molecules having different excitation spectra, which form components of a gas. The molecules are excited by laser pulses in a way that the molecules to be separated are transferred into a state of excitation due to multi-absorption of energy quanta from laser pulses, and in which they are extracted from the gas so that they exist in a composition determined by the form of the laser pulses. According to the invention, the laser pulses are formed by an iterative process in which each laser pulse varies in its form depending on the extracted molecules' composition after their absorption of energy quanta.

27 Claims, 8 Drawing Sheets

U.S. PATENT DOCUMENTS

| | | | |
|---|---|---|---|
| 5,527,437 A * | 6/1996 | Green et al. | 204/157.22 |
| 5,666,639 A * | 9/1997 | Eerkens et al. | 422/186 |
| 5,827,405 A | 10/1998 | Averbukh | 204/157.2 |
| 5,883,350 A * | 3/1999 | Eerkens et al. | 204/157.22 |
| 6,671,303 B1 * | 12/2003 | Pang | 372/59 |
| 2005/0023127 A1 * | 2/2005 | Woste et al. | 204/157.3 |

* cited by examiner

METHOD AND DEVICE FOR SEPARATING MOLECULES HAVING DIFFERENT EXCITATION SPECTRA

BACKGROUND OF THE INVENTION

The invention relates to a method for separating molecules having different excitation spectra and being components of a gas.

The invention further relates to a device for separating molecules having different excitation spectra and being components of a gas.

The invention further relates to a computer program for adjusting the laser pulses of a laser which is used to irradiate molecules of a gas in order to bring molecules to be separated into an excited state in which they can be extracted from the gas, and to a computer program product having such a computer program.

The molecules to be separated, which exist as parts of a gas, vary regarding their excitation spectra, i.e., regarding the position of the energy levels, which define the respective molecules' state of excitation. The term excitation spectrum is therefore used to describe the energetic state of a respective molecules' energy levels.

On one hand the molecules to be separated can be of different chemical properties, precisely, of a different chemical composition, thus different types of molecules which show different excitation spectra due to their different chemical properties. Or the molecules can be identical regarding their chemical properties and vary only in certain physical qualities, and therefore show different excitation spectra. The latter especially concerns isotopes of a particular molecular type, as the present invention also, predominantly concerns the matter of isotope separation (separation of molecular isotopes).

Here, the term molecules also refers to accumulations of atoms or molecules in the form of clusters, as described in Bergmann Schaefer, "Lehrbuch der Experimentalphysik", band 5, Vielteilchen-Systeme, Walter de Gruyter Berlin 1992, chapter 8.

Various methods are known for separating molecules, which show different excitation spectra due to their isotopic composition. From the U.S. Pat. No. 5,827,405 a method is known for separating an isotope from a gaseous isotopic-mixture consisting of two isotopes. Thereby laser pluses are irradiated into the isotopic mixture, which non-selectively stimulate both isotopes into a higher electronic quantum state at first. The isotopes, whose excitation spectra are quite close within the energy spectrum, and don't overlap because of their only slightly varying masses, are thereby excited into quantized vibrational states. The isotopes' wave packets oscillate in phase at first, but diverge spatially because of their isotope specific progression.

In the method described in U.S. Pat. No. 5,827,405 the isotopes' electronic excitation energy is calculated as well as the time, after which the wave packets of the different isotopes have spatially diverged so far that they oscillate in anti-phase. At this moment an additional laser pulse is irradiated into the isotope mixture. The isotope to be separated is higher excited by absorption of a further energy quantum, without it being possible for the other isotope to absorb an energy quantum from the additional laser pulse, because the excitation spectra show different energy levels due to the spatial separation of the wave packets, thus the different distance of the isotope nuclei.

The multi-excited isotopes can then be extracted from the gas mixture by known methods. This can be induced for example by chemical reactions or by ionization of the isotopes using electro-static fields.

Another method described in U.S. Pat. No. 5,827,405 is the excitation of a second electron from its original ground state into the same quantum state as the first electron, using the second laser pulse. Thereby the moment of the second excitation is calculated in a way, that the second excited electron of the not to be separated isotope oscillates spatially with the first electron, but shifted in phase. As a result, the oscillatory states of the electrons mutually cancel each other out, and a third laser pulse further excites the electrons of the to be separated isotope; the isotope can then be extracted from the isotope mixture using the known methods.

It is a disadvantage of these two methods that the methods function only if the quantum states of the isotopes, as well as the time span in which the oscillating wave packets diverge, are precisely calculated beforehand.

SUMMARY OF THE INVENTION

It is an object of the present invention to separate molecules having different excitation spectra, without the necessity of carrying out previous theoretical analysis and exact calculation of the molecules' quantum state.

This object is achieved by a method comprising:

exciting the molecules by laser pulses in a way that the molecules to be separated are transferred into a state of excitation due to multi-absorption of energy quanta of the laser pulses, extracting the excited molecules out of the gas, such that the molecules are existent in a composition determined by the form of the laser pulse, and shaping the laser pulses in an iterative process by varying the form of the laser pulses as a function of the composition of the extracted molecules after their absorption of energy quanta.

This object is further achieved by a device comprising:
a laser to excite the molecules by laser pulses,
a pulse modulator to shape the pulses of the laser,
a device to extract multi-excited molecules from the gas,
a detector to detect the extracted molecules, and
a control unit which controls the pulse modulator in an iterative process in a way that the form of the laser pulses is varied until the molecules detected by the detector are showing a composition which is optimized according to a predefined composition.

Using the method of this invention, laser pulses are shaped in an iterative process. The respective laser pulses are varied regarding their form, depending on the extracted molecules' composition after their absorption of energy quanta.

Thereby, variation of the form of the laser pulses means, for example, that they can be modulated regarding not only their frequency or amplitude, but also in their sequence and duration.

The composition of the extracted molecules consists of molecules of the gas, which differ according to their excitation spectrum. They consist, to certain percentages, of molecules to be separated and molecules not to be separated. The percentage of the molecule to be separated results from the excitation spectra of the extracted molecules.

If, for example, the gas contains only molecules having two different excitation spectra, of which an equal number is extracted, then the composition has a 1:1 ratio of extracted molecules having different excitation spectra.

An advantage of the method according to the invention is that—as opposed to the previously known methods—no exact calculations are necessary regarding the excitation energy and the pulse lengths or the pauses between laser pulses, in order to achieve the intended separation of molecules. An iterative process is started by a randomly chosen initial laser impulse. The process is stopped, when the extracted composition of the molecules is optimized, thus, for example, the ratio between two molecules of different excitation spectra is maximized. Thus, as a result of this separation method according to the invention, the previous pre-calculations become unnecessary.

Another advantage of the invention is that the method of the multi-excitation of the molecules to be separated is not predetermined by calculations. There are many different ways and manners to stimulate electrons into a state of excitation, in which they can be extracted. The iterative process allows the use of not only one method, but, for example, the combination of several methods, or it discovers and uses the best possible method. It is not necessary in this procedure to follow a predefined method of excitation. This is particularly advantageous compared to separation procedures with cw-lasers, as, e.g., known from U.S. Pat. No. 3,772,519 and U.S. Pat. No. 3,443,087, since there occurs exactly only one calculated excitation step.

Preferably, the laser pulse is varied regarding its form, until the molecules, which have been extracted as a result of the absorption of light quanta, show a composition, which is optimized according to a predefined composition. The predefined composition sets a target to the iterative process, according to which the composition of the extracted molecules is optimized.

In one embodiment of the invention, during the iterative process to shape a laser pulse, the laser pulse is, at first, directed into the gas to excite the molecules. Subsequently, multi-excited molecules are extracted from the gas and their composition is measured and compared to a predefined composition. The next method step entails varying the laser pulse and directing it into the gas again. Molecules are again extracted from the gas and their composition measured and compared to the predefined composition. This procedure is repeated until the composition of the extracted molecules is optimized according to the predefined composition.

Measuring the composition induces a feedback, on the basis of which the laser pulses are modified according to the information retained from the measured composition.

For example, separated molecules are extracted from the gas. Their composition is measured and evaluated, in particular the number of molecules to be separated in relation to the other molecules.

Beneficially, the form of the laser pulse is continuously varied until further variations achieve no further approach to the predefined composition.

Beneficially, the laser pulse is amplitude and/or phase modulated, and the modulation of the laser pulse is modified during the iterative process.

This enables a frequency and time related interaction of the modulated pulse with oscillatory quantum states, which leads to an optimal excitation of the molecule to be excited.

Particularly advantageous, the iterative process and the variations of the form of the laser pulse follow an evolutionary algorithm. Such an evolutionary algorithm is characterized by steps of mutation, cross-over and the survival of the fittest, in a way similar to biological evolution. Thus, during the iterative process, the form of the laser pulses is modified randomly (mutation), the pulses randomly exchange form characteristics (cross-over)—for example amplitude or phase values—and they are selected depending on their grade of optimization and further modified or discarded (survival of the fittest).

In one embodiment of the invention, it is intended that the excitation spectra of the molecules to be separated from the gas are similar to the excitation spectra of the molecules not to be separated in a way that the oscillatory energy levels of the different molecules show only slightly different energies, and the molecules are selectively excited into their oscillatory state by the laser pulse. A selective excitation of the molecules to be separated is achieved in a particularly advantageous way by excitation with a frequency modulated laser pulse. Until this invention, separating molecules with similar excitation spectra required very exact calculations. Now, according to the method of the invention, separation can be conducted without exact pre-calculations.

If the molecules' excitation spectra are so similar that even the individual excitation energies of the vibrational states have the same order, then molecules with different excitation spectra can be brought into quantum states with equal quantum numbers. There they oscillate at first in phase, and then diverge spatially and can be targeted and selective excited further, until they are extracted. This is an advantage compared to the known molecular separation with cw-lasers, where the temporal dynamics cannot be utilized.

In a particularly favored embodiment, the molecules to be separated are selectively excited by adjusting the used laser pulse in the iterative process within its frequency spectrum exactly to the specific excitation spectrum. The molecules to be separated are then selectively excited in rapid succession by a singular laser pulse.

Beneficially, molecules to be separated are stimulated by multi-excitation so far that they are either ionized or excited into Rydberg-states and then ionized by electromagnetic fields.

One embodiment of the invention intends that the molecules are either ionized by multiple electronic excitations, or dissociated. The multi-excited molecules to be separated are extracted chemically or by electromagnetic fields. Ionized molecules are best extracted using electrostatic fields, such as a quadruple mass spectrometer, and detected simultaneously.

Beneficial for the determination of the temporary and spectral form of the laser pulses is using a laser pulse detection unit. This form allows to draw conclusions about how the laser pulse was formed, and thus about the excitation process within the molecule.

A particularly favored embodiment of the method according to the invention intends that for providing the laser pulses a femtosecond laser is used, which creates laser pulses within a frequency range whose energetic equivalent correlates to electronic excitation energies of the to be separated molecules' quantum states. A great energy transfer into the gas results from the use of ultra short laser pulses. Furthermore, the frequency spectrum of femtosecond lasers is broader then the frequency-spectrum of the so far often used tunable cw lasers. A laser pulse with a broad frequency spectrum can bring molecules from the gas into excited states with different quantum numbers so the electronic multi excitation occurs not in a predetermined and pre-calculated way with exactly defined quantum states, but over several different ways with similar quantum numbers. By the iterative process, the best possible way of excitation is found.

An advantage here is the short interaction period of the laser pulse down to the sub-picosecond range, allowing a fast separation of the molecules relative to the generally hampering internal energy redistribution to other vibrational modes. Thus, the procedure is also feasible for large molecules with generally rapid redistribution of vibrational modes. This is advantageous compared to the method which requires a sufficiently long time duration for isotope separation.

A further object of the invention is to provide a device for carrying out the method of separating molecules from a gas. This further object is achieved by a device comprising:

a laser to excite the molecules by laser pulses, a pulse modulator to shape the pulses of the laser, a device to extract multi-excited molecules from the gas, a detector to detect the extracted molecules, and a control unit, which controls the pulse modulator in an iterative process, in a way that the form of the laser pulses is varied until the molecules detected by the detector are showing a composition which is optimized according to a predefined composition.

According to the invention the device contains a control unit, which controls a laser pulse modulator in an iterative process in a way that the form of the laser pulses is varied until the extracted molecules detected by the detector show a composition regarding the excitation spectra which is optimized according to a predefined composition.

The control unit can, for example, be a computer with a control program. Beneficially, the control unit co-operates with the evaluation unit, which evaluates the composition of the extracted molecules of different excitation spectra detected by the detector.

A further object of the invention is to provide a computer program for adjusting laser pulses for the method and the device, respectively, to separate molecules from a gas.

This further object is achieved by a computer program for adjusting the laser pulses of a laser which is used to irradiate molecules of a gas in order to bring molecules to be separated into an excited state in which they can be extracted from the gas, having control means for controlling the form of the laser pulses, comprising:

evaluation means for evaluating a measured composition of molecules having different excitation spectra and extracted from the gas, and comparative means for automatic comparison of the measured composition with a predefined composition, the control means, depending on the result of the comparison, automatically initiating in a further iteration a variation of the form of the laser pulses, or the form of the laser pulses remains unchanged.

According to the invention the computer program contains evaluation means to evaluate a measured composition of molecules with different excitation spectra extracted from the gas. Furthermore, comparative means for an automatic comparison of the measured composition with a predefined composition are provided, whereby, depending on the comparison's result, the control means automatically initiate a variation of the laser pulses form in a further iteration, or the form of the laser pulses remains unchanged.

Preferably the computer program contains variation means, which vary the form of the laser pulses, if the comparison by the comparative means finds that the measured composition is not optimized, and that the variation means transfer information about the variation of the laser pulses' form to the control means. Beneficially, the variations follow an evolutionary algorithm.

Further characteristics and advantages of the invention are explained in an exemplary fashion with reference to the embodiments illustrated in the accompanying drawings.

DESCRIPTION OF PREFERRED EMBODIMENTS

Figure 1:
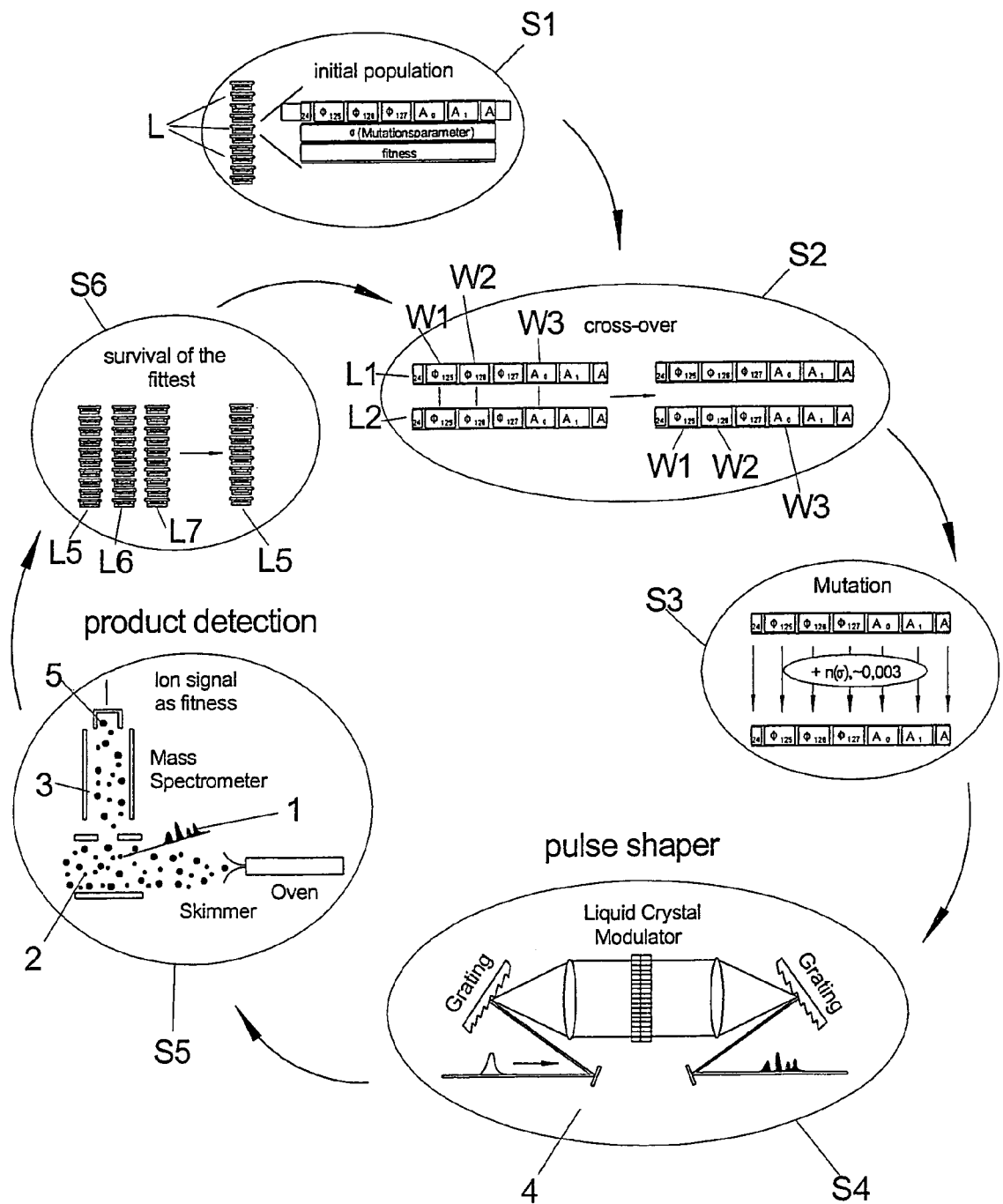
FIG. 1 shows a schematic course of an isotope separation method by an iterative process according to an evolutionary algorithm.

FIG. 1 shows a schematic course of a procedure for separating molecules with a different absorption spectrum; namely of an isotope separation procedure by an iterative process using an appropriate device 1 to 5. Hereby the iterative process follows an evolutionary algorithm.

The gas 2 consisting of the molecules to be separated is provided by a vacuum apparatus for the production of cold molecule or cluster beams in a free supersonic expansion. On hand, molecules with two isotopes of the same element form a gas. The molecules show two different total masses, as a result of the two isotopes, and therefore the molecules also show different excitation spectra.

In order to separate particular isotopes a laser in the form of a femtosecond laser is used which beams ultra short laser pulses 1 within a frequency range (femtosecond range) with which an electronic excitation of the molecules of the gas 2 is triggered, thereby enabling the separation. The laser pulses 1 are used to irradiate into the gas 2.

For separation of particular isotopes a laser in the form of a femtosecond laser is used, which delivers ultrashort laser pulses 1 in a frequency range, inducing a separation enabling electronic excitation of the molecules of the gas 2. The laser pulses 1 are required to be irradiated into the gas 2.

Attributed to the laser is a laser pulse modulator 4 for modulating the laser pulses 1 of the laser. The pulse modulator 4 is constructed as an amplitude and phase modulator with liquid crystals, and is arranged in the Fourier plane of an appropriate grid system for generating time and frequency formed laser pulses 1.

To control the pulse modulator a microprocessor with a computer program is used, which controls the iterative separation process and in particular specific liquid crystals of the pulse modulator 4.

The laser pulses 1 formed by the pulse modulator 4 excite molecules of the gas 2 to such an extent that some of them are ionized by multi-absorption of light quanta of the laser pulses 1. The ionized molecules are extracted from the gas by electro-static fields, are separated by a mass spectrometer 3 according to their isotope specific composition and then detected by an ion detector 3. The signals from the ion detector 3 are sent to the computer program, which compares the measured composition of the extracted molecules with a predetermined composition.

The laser pulses L, which are intended for the laser pulse modulator 4, are initially determined in a method step S1 in such a fashion that within the spectral range of the laser, random, consecutive amplitude- and phase values are configured.

The laser pulses L are then, in a second method step S2, crossed over randomly. Random cross over means that randomly chosen amplitude and phase values W1, W2, and W3 of two laser pulses L1 and L2 are exchanged. The equivalent to this method step of the biological "evolutionary algorithm" would be the random cross-pollination of chromosomes.

In the following method step S3, the amplitude and phase values of the laser pulses are randomly modified by the small amount n (σ), in order to simulate a mutation.

The pulse forms generated in this manner are sent in step S4 to the pulse modulator 4. In FIG. 1 the pulse modulator is a liquid crystal pulse modulator, whose crystals are individually controlled, in order to shape amplitude and frequency of the laser pulses 1.

Thereupon, in step S5 laser pulses formed by the pulse modulator are directed into the isotopic gas, which leads to multi-excitation and ionization of several molecules. Molecules, which are only single-excited (as opposed to multi-excited) by a laser pulse, are not ionized. The emerging ions are extracted in an ion optic by electrostatic fields, selected with a quadruple mass spectrometer 3 and detected in an electron multiplier. Thereby, the composition of the ionized isotopes is measured and their "fitness" is tested. It is tested, whether a first isotope composition—measured after irradiation of a first laser pulse—correlates better to a predefined isotope composition than a second isotope composition, which was measured after the irradiation of a second laser pulse. In this way, a "fitness" is assigned to each laser pulse form.

In step S6 the best out of the laser pulse forms L5 to L7 are selected. Each laser pulse form gets assigned an isotope composition of extracted molecules, which resulted in the experiment from the irradiation of a laser pulse with the particular laser pulse form. The laser pulse forms, whose assigned isotope compositions show the greatest similarity to the predefined isotope composition, are selected. The laser pulse forms L6 and L7 are discarded, the laser pulse form L5 is used further. Thereby, only the laser pulse forms, which show the greatest similarity to the predefined, sought after isotope compositions, are used further.

These laser pulse forms are crossed over in step S2, and a new iteration of the process begins. Deciding means, not included in FIG. 1, decide when the laser pulse form has been optimized to a point where the iterative process is terminated. Usually the process is terminated when the "fitness" of the obtained isotope composition remains unchanged. These deciding means are integrated into the computer program of the experimental unit.

A possible isotope composition is, for example, the maximization of one isotope sort. But a composition of various isotopes can also be predefined in the form of a fraction number, i.e. a composition of three different isotopes in the ratio 1:2:3.

Figure 2:
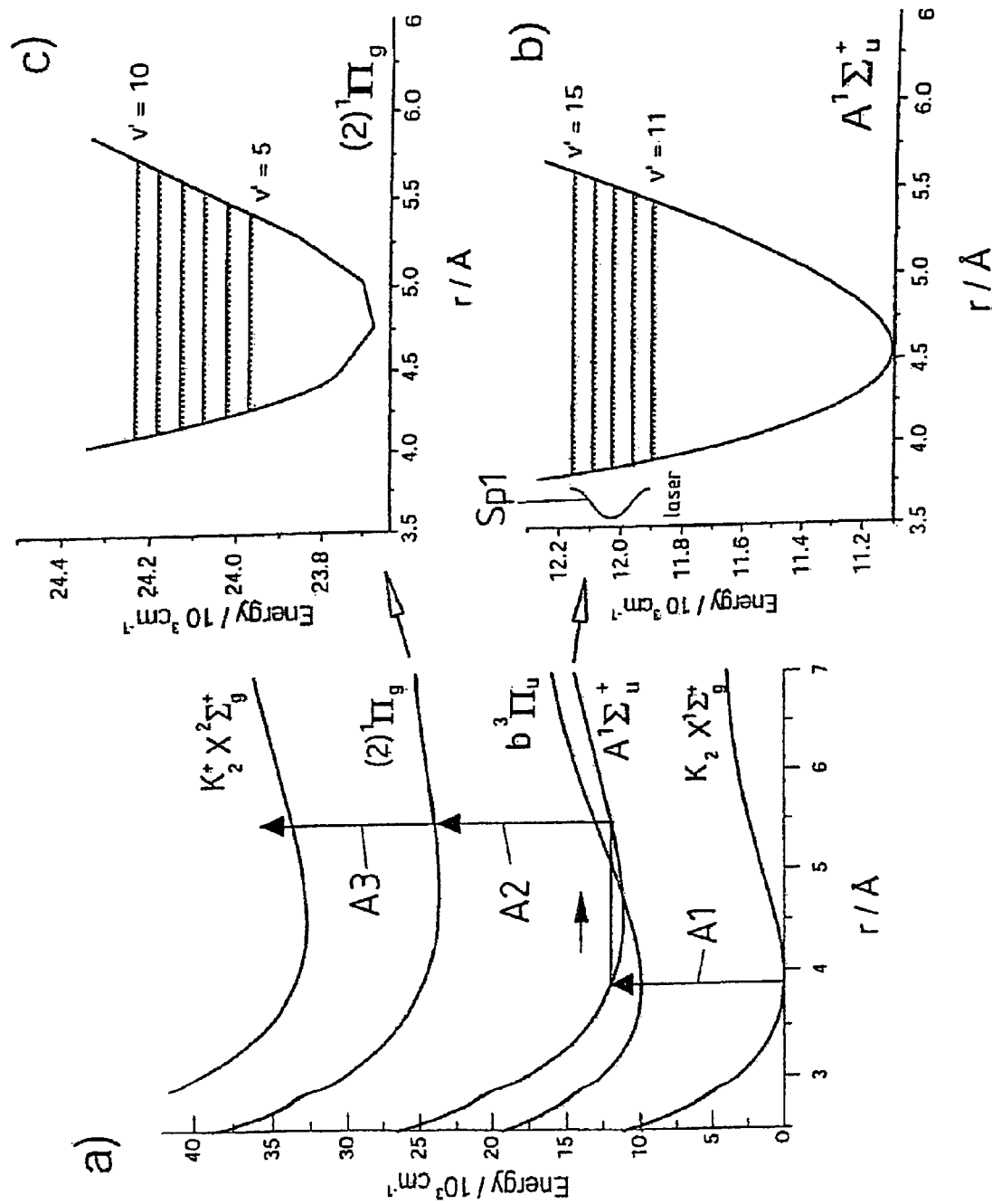
FIG. 2 shows the energy level scheme of gaseous $K_2$ in three diagrams, whereby particularly the vibrational level of the $^1\Sigma_u^+$ and the $(2)^1\Pi_g$ states are shown.

FIG. 2 shows in the chart a) energy levels of a $K_2$ molecule as a function of the excitation state detailed on the right hand side. The ionization path of a selectively excited electron is traced with arrows. By absorption of a first energy quantum A1 of a laser pulse, an electron is excited from its ground state into the $A^1\Sigma_u^+$ state, by absorption of a second energy quantum A2 into the $(2)^1\Pi_g$ state, whereupon it is further excited and ionized by absorption of a third energy quantum A3. The ionization occurs using a single laser pulse which has been formed by an iterative process.

The potential curves of the $A^1\Sigma_u^+$ state of gaseous $K_2$ molecules is shown in diagram b). The potential curve is known from the prior art ((cf. W. Meyer (unpublished) and G. Jong, L. Li, T.-J. Wung and W. C. Stwally, J. Molec. Spectrosc. 155 (1992) 115), as well as the potential curve of the excited $(2)^1\Pi_g$ state resulting from the absorption of the energy quantum A2 portrayed in diagram c).

In all three diagrams, the x-axis represents the distance of the nuclei denoted in Å and the y-axis represents the excitation energy denoted in $cm^{-1}$. The continuous lines in the diagrams b) and c) describe the oscillatory levels of the $^{39,39}K_2$ isotope, whereas the dotted lines in the diagrams b) and c) represent the oscillatory levels of the $^{39,41}K_2$ isotope. The oscillatory levels of the quantum numbers v'=11 to v'=15 are presented in diagram b). To the left, beside the excitation spectrum, the unformed spectrum Sp1 of the used laser pulse with a central wavelength of 833 nm is presented.

The oscillatory levels v'=12, 13 of the lighter isotope is disturbed by Spin path interaction with the $b^3\Pi_u$ state and thereby slightly shifted by +1.2 $cm^{-1}$ and +2.1 $cm^{-1}$, respectively (cf. S. Rutz, R. de Vivic-Riedle and E. Schreiber. Phys. Rev. A, 54 (1996) 306).

The laser spectrum provides laser pulses within a frequency range whose energetic equivalent corresponds to electronic excitation energies of quantum states of the molecules to be separated (in FIG. 2 the laser pulse spectrum corresponds to v'=12, 13 and 14 listed beside). The molecules are transferred into electronic excited states by absorption of laser pulses, whose vibrational quantum number is not equal to 1. Only sufficiently above the ground state, the vibrational levels are separated far enough for a selective excitation.

Figure 4:
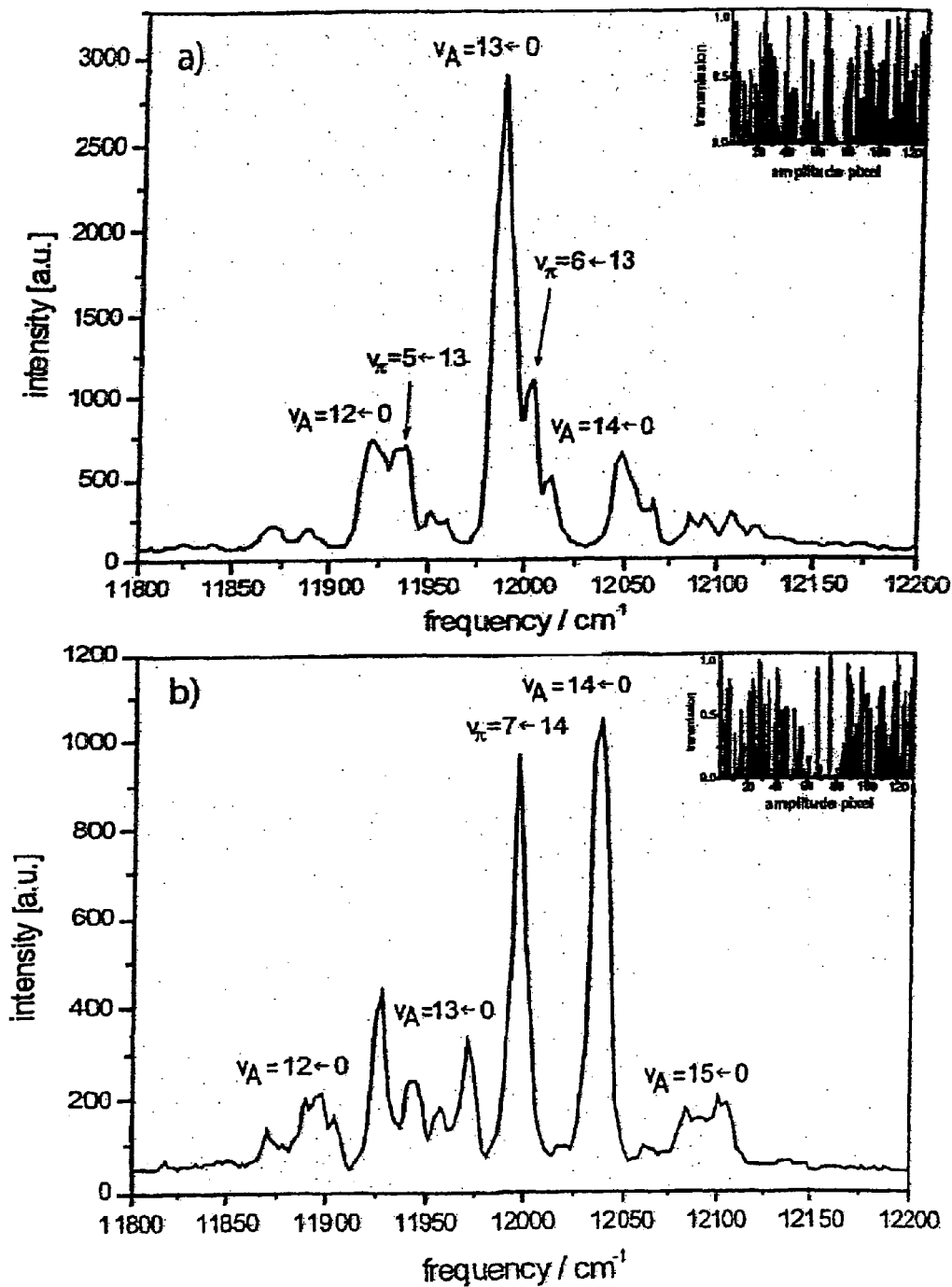
FIG. 4 shows a laser pulse spectrum, optimized by an iterative process, for the maximization a) and minimization b) of the isotope ratio to the diagrams of the FIGS. 3a) and 3b) at a laser light wavelength of 833 nm.

The excitation shown in diagram a) of FIG. 2 occurs as a result of a short pulse with a wide spectrum, out of which only some frequencies are chosen (cf. FIG. 4). Due to the rapid successive multi-excitement the internal vibrational modes are not redistributed, and only one mode is excited. These fast consecutive multi-excitations demonstrate the advantage of the method according to the invention as compared to the method described in the above mentioned U.S. Pat. No. 5,827,405, whereby an accordingly long time delay between the excitation steps is required in order to achieve an efficient revival of the wave packet.

The usage of short laser pulses of a femto-second laser is therefore especially suitable also for selective excitation of large molecules.

In the diagrams b) and c) of FIG. 2 one can see that the excitation spectra of molecules build from isotopes are only slightly different; here the energy levels are only approximately five to ten wave numbers apart. The only slightly different excitation spectra of the isotopes have the same quantum numbers for energy levels, which lie close together. However, by using the method according to the invention, also chemically different molecules can be separated from each other, whose energy levels with different quantum numbers are so close together, that they can hardly be separated by prior art methods.

Figure 3:
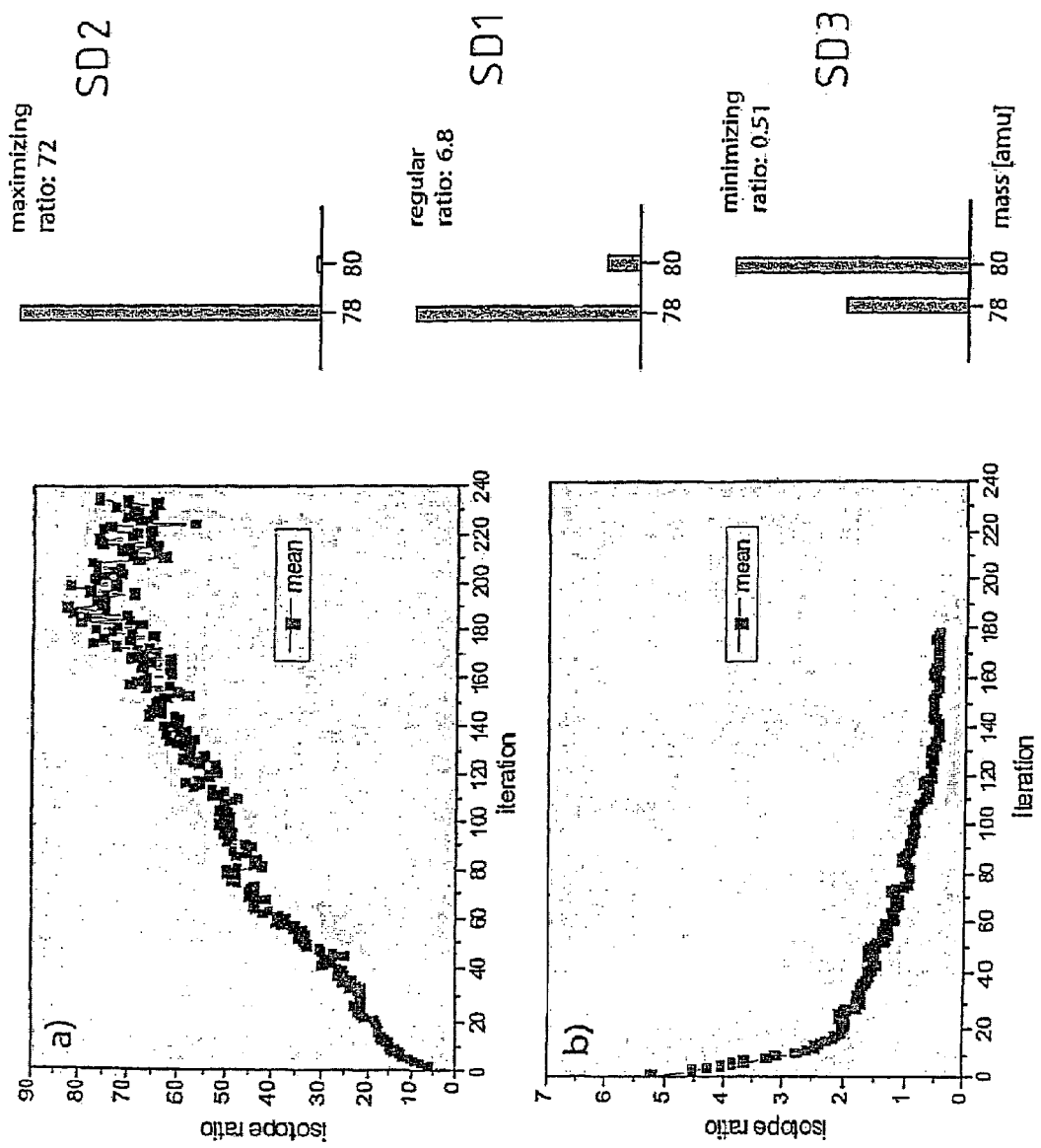
FIG. 3 shows a diagram of the course of an iterative process for the maximization a) and minimization b) of the ratio between $^{39,39}K_2$ isotopes and $^{39,41}K_2$ isotopes within the $K_2$ molecules extracted from a $K_2$ isotope mixture.

FIG. 3 shows a diagram of an iterative process for the maximization a) an minimization b) of the ratio between $^{39,39}K_2$ and $^{39,41}K_2$ isotopes within the $K_2$ molecules extracted from the $K_2$ isotope mixture. The x-axis counts the iterations; the y-axis shows the rate between both isotopes. The natural composition of the two $K_2$ isotopes equals approximately 6.8 molecules of the lighter isotope to 1 molecule of the heavier isotope. This rate is shown in FIG. 3 in a bar chart SD1. The bar numbered 78 details the quantity of $^{39,39}K_2$ isotopes, the bar numbered 80 details the quantity of the $^{39,41}K_2$ isotopes. In the diagrams a) and b), the average ratio for each iteration is presented. Both graphs start at a composition in a ratio 6.8 to 1. During the optimization by the iterative process the ratio changes for both optimization cases. In both cases a convergence is only reached at more than 150 iterations. The result is presented in the bar chart SD2 for the maximization and in the bar chart SD3 for the minimization. In the case of maximization a ratio of 72:1 is reached, in the case of minimization a ratio of 0.51:1 is reached.

While modulating the laser pulses it is also possible to modulate only the phase. However, only a factor of 2 between the minimized and maximized ratio was achieved experimentally, whereas for the modulation of phase and amplitude the factor amounts about 140. It is also possible to perform pure amplitude modulation which provides a factor of approx 80.

FIG. 4 shows a laser spectrum optimized by an iterative process for the maximization a) and minimization b) of the isotope ratio to the diagrams of FIGS. 3a) and 3b) with a laser wavelength of 833 nm as central wavelength. On the x-axis the frequency is listed in cm$^{-1}$, and the y-axis shows the intensity of the respective frequency. The details on the peaks refer to the vibration specific transitions from the electronic ground state into the excited $A^1\Sigma_u^+$ state (marked with $V_A$), as well as to the transition from the $A^1\Sigma_u^+$ state into the $(2)^1\Pi_g$ state (marked with $v_\Pi$). This shows the selective excitation according to FIG. 2a). Differences are notable between the spectrum of the maximization a) and minimization b). For the minimization the peaks are shifted in comparison to the peaks of the maximization by approximately 10 cm$^{-1}$ towards the lower frequencies, so that frequency ranges with high intensities at the maximization correlate to low intensities at the minimization and visa versa. The different laser forms for the two different processes explain the high isotope selectivity of the method.

In experiments in which the laser pulse form was only modulated regarding the amplitude, some peaks are missing within the low frequency section part of the spectrum. This can be explained by the fact that in the case of a pure amplitude modulation the temporary modulation of the pulse is limited, and that therefore excitation occurs mainly within a limited nuclear distance without including the molecular dynamic.

The additions at the upper right hand corner of the two diagrams show the adjusted transmission for the elements of a liquid crystal array, as it was used for a pulse modulator modulating the laser pulse.

Figure 5:
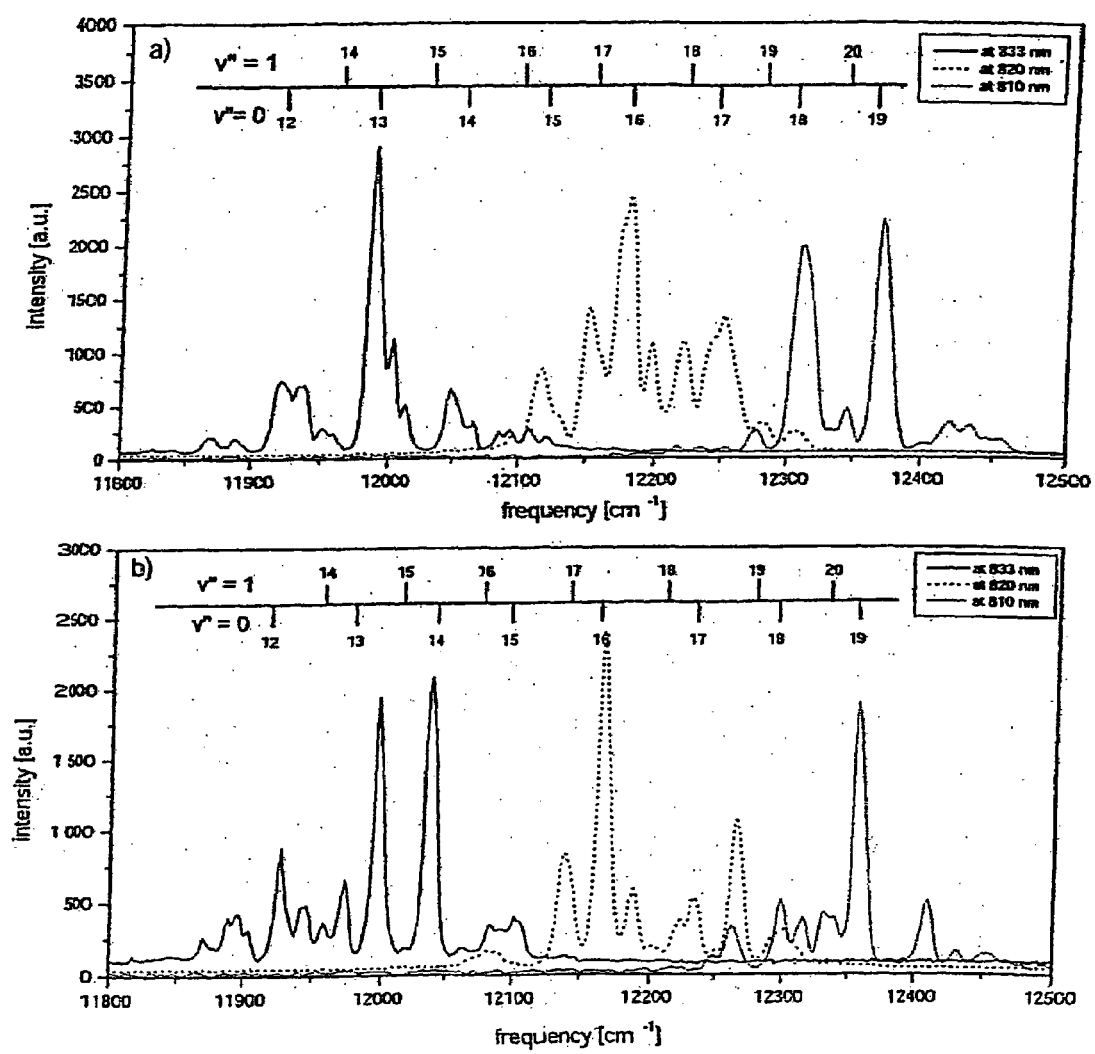
FIG. 5 shows a laser pulse spectrum, optimized by an iterative process for the maximization a) and minimization b) of the isotope ratio at a laser light wavelength of 810, 820 and 833 nm.

FIG. 5 shows a laser pulse spectrum optimized by an iterative process for the maximization a) and minimization b) of the isotope ratio to the diagrams of the FIGS. 3a) and 3b). This time three different laser light wavelengths with central wavelengths of 810, 820 and 833 nm were used.

The diagram descriptions are analog to those of FIG. 4. Additionally the upper part of the diagrams show the oscillation levels of the two types of isotopes, once for the case, that the isotopes are excited by the laser pulse from the initial ground state at v"=0 into the first excited state, and once for the case, that the isotopes are excited from the ground state at v"=1 into the vibrational levels of the excited state. The upper diagram a) refers to the lighter $^{39,39}K_2$ isotopes, the lower diagram refers to the heavier $^{39,41}K_2$ isotopes. Thus, the laser pulses excite exactly the molecules, which are supposed to be ionized by multi-excitation, until extracted from the isotope mixture.

The optimization by the iterative process provides comparable results for all three used wavelengths. This shows the independence of the method in comparison to frequency changes by lasers with different central wavelengths. Thus, the method can be used with nearly any laser wavelength for a wide range of different molecules.

Figure 6:
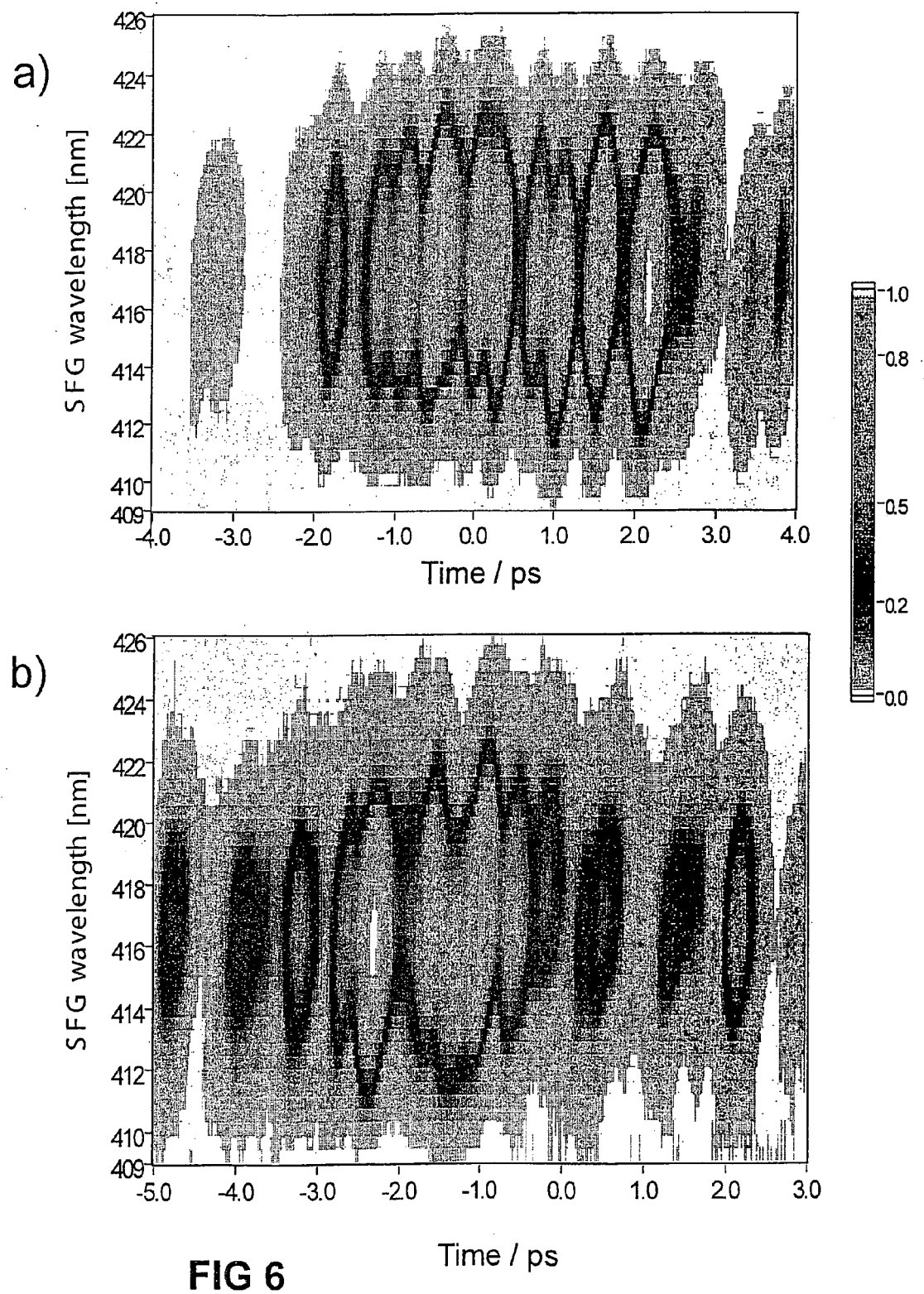
FIG. 6 shows a diagram of a XFROG-trace of a laser pulse, optimized by an iterative process, for the maximization (a) and minimization (b) of the isotope relation to the diagrams of the FIGS. 3a) and 3b).

FIG. 6 shows a diagram of an XFROG-trace of a laser pulse optimized by an iterative process for the maximization a) and minimization b) of the isotope-ratio to the diagrams of the FIGS. 3a) and 3b). In both cases complex pulse forms with several sub-pulses can be seen, which extend over several pico-seconds. Thereby the distance of the sub-pulses often equals 250 fs, which corresponds to half an oscillation-period in an $A^1\Sigma_u^+$ state. Thus, FIG. 6 allows conclusions about the actual excitation process of the isotopes. A more exact calculation prior to the iterative process is not necessary. The process can be started without exact pre-calculations. The XFROG-trace of FIG. 6 allows the conclusion that the isotopes were excited in steps via the $A^1\Sigma_u^+$ state, whereby the respective wave packet is generated at the inner return point of the potential, and whereby it propagates within half an oscillation period to the outer return point, at which it then is further excited resonantly. The wavelength shift of up to 2 nm of the temporally separated sub-pulses provides information on the successive excitation of specific oscillation levels of electronic states on the pathway to optimal ionization. The main ionization path runs as shown in the diagram a) of FIG. 2. This is especially well recognizable in the minimization case, where the low frequent sub-pulses appear first ($A^1\Sigma_u^+$<-X $A^1\Sigma_u^+$ transition comp. FIG. 4 b)). Destructive and constructive interferences of the generated wave packets may also appear, as previously mentioned.

Figure 7:
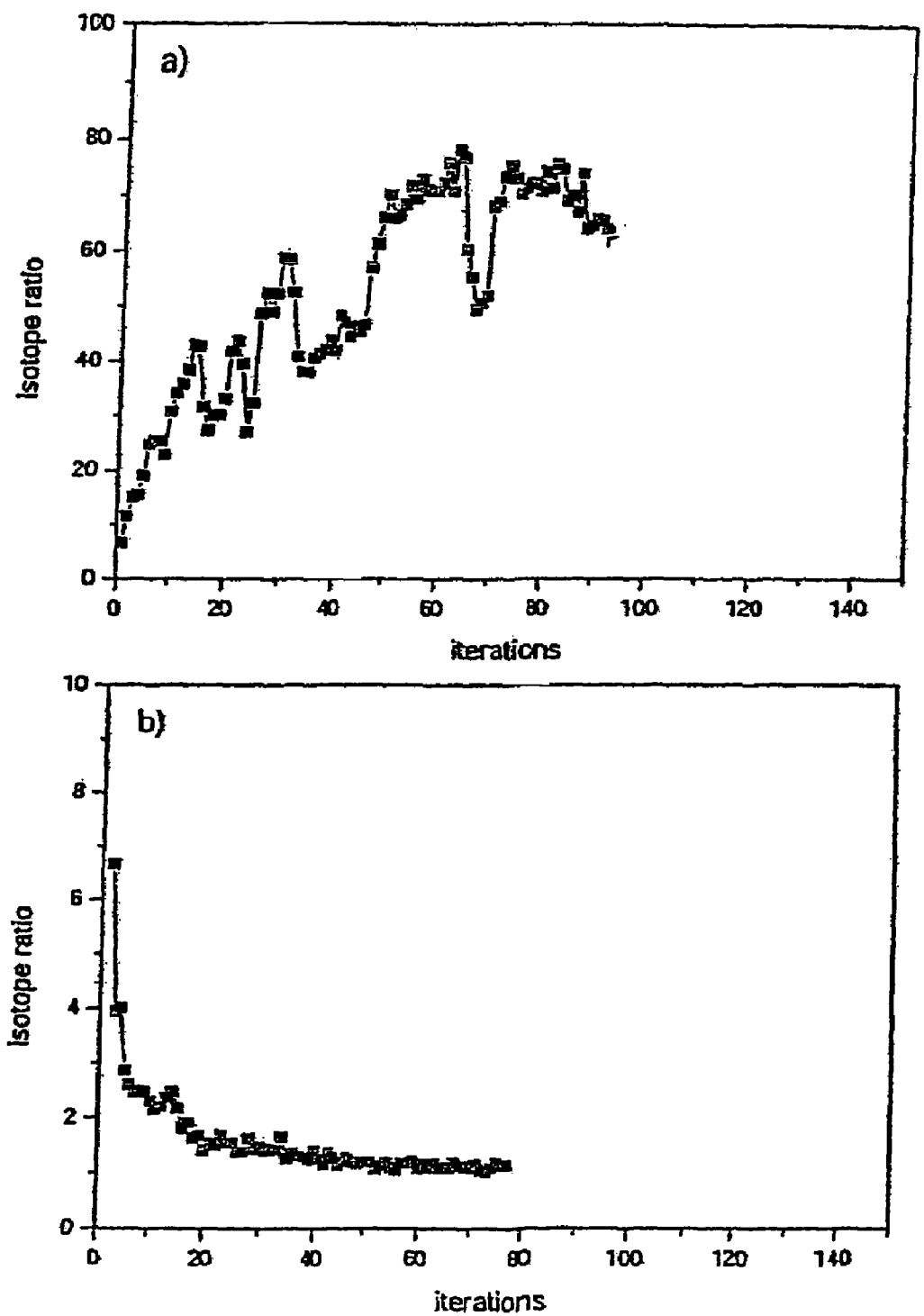
FIG. 7 shows a diagram of the course of an iterative process for the maximization a) and minimization b) of the ratio between the $^{39}K$ and $^{41}K$ isotopes within the NaK molecules extracted from a NaK isotope mixture.

FIG. 7 shows a diagram of an iterative process for maximization a) and minimization b) of the ratio between $^{39}K$ isotopes and $^{41}K$ isotopes within the NaK-molecules extracted from a NaK isotope mixture. The diagrams are set up as those of FIG. 3. During the optimization a change in the ratio for both optimization cases can be seen. Convergence is reached in both cases after approximately 100 iterations. Altogether the diagrams show for NaK a change of the isotope ratio by a factor of approximately 70 between maximization and minimization.

Also in this case a separation of the molecules can be performed prior to calculation because the iterative process automatically finds a laser pulse suitable for separation.

Figure 8:
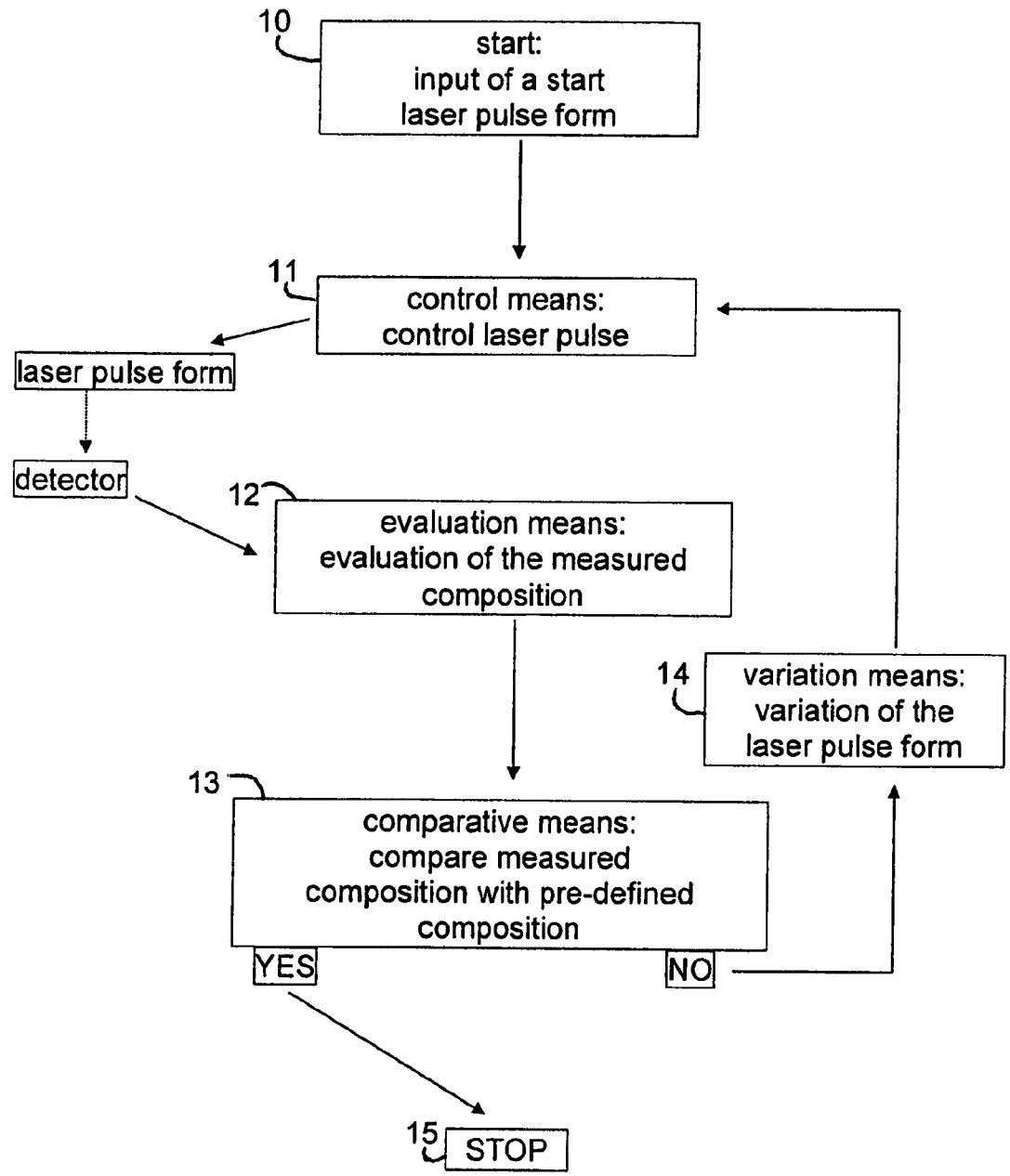
FIG. 8 shows a structure diagram of a computer program product for adjusting a laser pulse in order to separate molecules by an iterative process.

FIG. 8 shows a structure diagram of a computer program product for adjusting a laser pulse to separate molecules by an iterative process.

Beginning at start 10, a laser pulse form is predefined. This is transferred onto control means 11, which modulate the laser pulses by a laser pulse modulator. The laser pulse is directed into a gas, from which some molecules are multi-excited and extracted. The extracted molecules are measured in a detector and counted depending on the type of molecule. Counted are, for example, two different isotopes of one element. But, likewise, other mixtures of molecules with similar excitation-spectra can be separated, e.g. proteins and nucleotides.

The detector transfers the measured data to evaluation means 12, which determine the composition of the molecules differing in their excitation spectra. This measured composition is transferred to comparative means 13, which compare the measured composition with a predefined composition. If the measured composition is optimized according to the predefined composition, which means that the measured composition has not approached further to the predefined composition during the previous iteration, the iterative process is stopped. The comparative means select—for example—in an evolutionary algorithm of several laser pulses only the laser pulses, by which the best compositions of extracted molecules had been extracted ("survival of the fittest").

However, if the measured composition has approached the predefined composition or has diverged from it, variation means 14 evaluate the used laser pulse form, vary it for example according to an evolutionary algorithm by mutation and/or cross-over and send information for the new laser pulse form to the control means 11. This continues, until the comparative means stop the process.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

What is claimed is:

1. A method for separating molecules having different excitation spectra and being components of a gas, the method comprising:
   exciting the molecules by laser pulses in a way that the molecules to be separated are transferred into a state of excitation due to multi-absorption of energy quanta of the laser pulses,
   extracting the excited molecules out of the gas, such that the molecules are existent in a composition determined by the form of the laser pulse,
   shaping the laser pulses in an iterative process by varying the form of the laser pulses as a function of the composition of the extracted molecules after their absorption of energy quanta.

2. The method according to claim 1, further comprising: varying the laser pulse regarding its shape, until the molecules, which have been extracted as a result of the absorption of energy quanta, show a composition which is optimized according to a predefined composition.

3. The method according to claim 2, further comprising: varying the form of the laser pulse until further variations achieve no further approach to said predefined composition.

4. The method according to claim 1, further comprising during the iterative process to shape a laser pulse:
   irradiating the laser pulse into the gas in order to excite the molecules,
   extracting multi-excited molecules from the gas,
   measuring the composition of the extracted multi-excited molecules,
   comparing said composition with a predefined composition,
   varying the form of the laser pulse and repeatedly directing the laser pulse into the gas, until the composition of the extracted molecules is optimized according to said predefined composition.

5. The method according to claim 1, wherein the laser pulse is amplitude and/or phase modulated and the modulation of the laser pulse is changed by the iterative process.

6. The method according to claim 1, further comprising: performing the iterative process and the variation of the form of the laser pulse in accordance with an evolutionary algorithm.

7. The method according to claim 1, wherein the molecules of the gas, after the absorption of a first energy quantum from the laser pulse, are brought into electronically excited quantum states, which are energetically above the vibrational ground state in such a way that the wave packets formed by the excited molecules diverge spatially because of their different molecule-specific excitation spectra and require energy quanta of different energy for further excitation.

8. The method according to claim 1, wherein the molecules to be separated are selectively excited by the laser pulse several times in a way that the molecules can be extracted.

9. The method according to claim 1, wherein the molecules to be separated are ionized by multi-excitation, or are excited into Rydberg-states and ionized by electromagnetic fields.

10. The method according to claim 1, wherein the multi-excited molecules to be separated are extracted chemically or by electromagnetic fields.

11. The method according to claim 1, wherein a femtosecond laser is used to generate the laser pulses.

12. The method according to claim 1, further comprising: using a laser pulse detection unit to determine the temporally and spectral form of the laser pulses.

13. A device for separating molecules having different excitation spectra and being components of a gas, comprising:
   a laser to produce laser pulses to excite the molecules to be separated into a state of excitation due to multi-absorption of energy quanta of the laser pulses,
   a pulse modulator to shape the pulses of the laser,
   a device to extract multi-excited molecules from the gas and form a composition determined by the form of the laser pulses,
   a detector to detect the extracted molecules, and
   a control unit, which controls the laser in an iterative process, to shape the laser pulses in a way that the form of the laser pulses is varied as a function of the composition of the extracted molecules after their absorption of energy quanta.

14. The device according to claim 13, further comprising a detector to detect the extracted molecules and a pulse modulator to shape the pulses of the laser, and wherein the control unit controls the pulse modulator in a way that the form of the laser pulses is varied until the molecules detected by the detector are showing a composition which is optimized according to a predefined composition.

15. The device according to claim 14, further comprising an evaluation unit, which interacts with the control unit and evaluates the composition of the separated molecules of different excitation-spectra, as detected by the detector.

16. The device according to claim 15, wherein the evaluation unit and the control unit include a computer program, which controls the iterative process.

17. The device according to claim 14, wherein
the pulse modulator comprises individually controllable liquid crystal elements, which modulate the form of the laser pulses, particularly the phase and/or the amplitude of the laser pulses, and
the control unit controls the individual liquid crystal elements of the pulse modulator in order to vary the form of the laser pulses.

18. The device according to claim 14, wherein the iterative process follows an evolutionary algorithm.

19. The device according to claim 14, further comprising a mass spectrometer, to measure the composition of the specific masses of the extracted molecules.

20. The device according to claim 19, wherein the mass spectrometer is a quadruple mass spectrometer.

21. The device according to claim 14, further comprising an ion detector for measuring the ionized molecules.

22. The device according to claim 14, wherein, in order to form the laser pulses, the pulse modulator is arranged in the Fourier-plane of a grid pattern for generating laser pulses shaped in time and frequency.

23. The device according to claim 14, further comprising an electrostatic extraction unit for emerged ions for extracting multi-excited molecules.

24. The device according to claim 14, further comprising a laser pulse detection unit for determining the temporary and spectral form of the laser pulse.

25. The device according to claim 13, additionally including a computer program associated with the control unit which controls the laser for adjusting the laser pulses of the laser, the computer program comprising:
evaluation means for evaluating a measured composition of the molecules having different excitation spectra and extracted from the gas, and
comparative means for automatic comparison of the measured composition with a predefined composition, the computer program controlling the control unit, depending on the result of the comparison, to initiate an iteration of the laser pulses with a variation of the form of the laser pulses, or to keep the form of the laser pulses unchanged.

26. The device according to claim 25, wherein variation means vary the form of the laser pulses, if the comparison by the comparative device shows that the measured composition is not optimized, and the variation means transfer information about the variation of the form of the laser pulses to the control unit.

27. The device according to claim 25, wherein the iterative process follows an evolutionary algorithm.

* * * * *